United States Patent [19]

Shibata

[11] Patent Number: 5,364,183
[45] Date of Patent: Nov. 15, 1994

[54] DRIVING MECHANISM FOR KNEADING BLADE OF A BREAD PRODUCTION DEVICE

[75] Inventor: Masaharu Shibata, Daito, Japan

[73] Assignee: Funai Electric Co., Ltd., Daito, Japan

[21] Appl. No.: 961,468

[22] Filed: Oct. 15, 1992

[30] Foreign Application Priority Data

Oct. 16, 1991 [JP] Japan .................................. 3-267803

[51] Int. Cl.⁵ ................................................ B01F 7/16
[52] U.S. Cl. .................................... 366/98; 74/421 A; 366/314
[58] Field of Search ...................... 366/98, 99, 97, 100, 366/314, 205, 601; 99/348; 74/421 A

[56] References Cited

U.S. PATENT DOCUMENTS

| 1,715,232 | 5/1929 | Graf | 366/98 |
| 2,295,136 | 9/1942 | Stiers | 366/98 |
| 4,147,071 | 4/1979 | Scribner | 74/421 A |
| 4,435,084 | 3/1984 | Calhoun | 366/314 |
| 4,619,162 | 10/1986 | Laere | 74/421 A |
| 4,776,265 | 10/1988 | Ojima | 99/348 |

Primary Examiner—Robert W. Jenkins
Attorney, Agent, or Firm—Lackenbach Siegel Marzullo Aronson & Greenspan

[57] ABSTRACT

In a driving mechanism of a kneading blade of a bread production device driven by a motor through the reduction gear, a reduction ratio of the reduction gear is adapted to be more than 10:1. By this, the motor which drives the kneading blade is miniaturized.

6 Claims, 5 Drawing Sheets

FIG. 4

| PROCESS | PRIOR TIME | TIME IN THIS EMBODIMENT |
|---|---|---|
| COOLING | M8 | M8 |
| BAKING | M7 | M7 |
| ROASTING | M6 | M6 |
| WAITING | M5 | M5 |
| ROUNDING | M4 | M4 |
| FERMENTATION | M3 | M3 |
| 2ND KNEADING | m2 | m4 |
| STOPPED | M2 | M2 |
| 1ST KNEADING | m1 | m3 |
| PREHEATING | M1 | M1 |

1

DRIVING MECHANISM FOR KNEADING BLADE OF A BREAD PRODUCTION DEVICE

BACKGROUND OF THE INVENTION

This invention relates to a driving mechanism which transmit the rotation of the motor in a bread production device to a kneading blade.

A construction wherein the motor (23) of a bread production device (22) driving a kneading blade (24) is, as shown in the conventional drawing 5, provided with a pulley (25) at the top end of the motor (23) having 1800 r.p.m. at a torque of 4 kg. cm and provided with a pulley (27) at rotary shaft (26) connected to the blade (24).

The two pulleys (25), (27) are connected to each other through a belt (28). When the motor (23) rotates, the pulley (27) rotates through the belt (28) from the pulley (25) and this rotation rotates the rotary shaft (26). By this, the kneading blade (24) rotates at 230 r.p.m. with 30 kg. cm in torque.

BRIEF DESCRIPTION OF THE INVENTION

In the above conventional device, since the kneading blade (24) and the motor (23) are connected with pulleys (25), (27) and a belt (28), when a small motor is used for maintaining the torque of the kneading blade at 30 kg. cm, the size of the pulley (27) must be kept large to maintain a large reduction ratio. On the contary, when the size of the pulley (27) are smaller, the reduction ratio of the pulleys (25), (27) becomes smaller, which causes the use of a large motor (23). In fact, although the motor (23) having approximately 7.8:1 of reduction ratio and 4 kg. cm of motor torque is used, the size of the bread production device itself becomes unfortunately larger.

This invention proposes that in such a bread production device as shown in the above description, the reduction gear ratio thereof is adapted to be more than 10:1 by a reduction gear driven by a motor.

BRIEF DESCRIPTION OF THE DRAWINGS

FIG. 4 is a comparsion drawing of bread making time in this embodiment and in a conventional one.

DETAILED DESCRIPTION OF THE INVENTION

Figure 1:
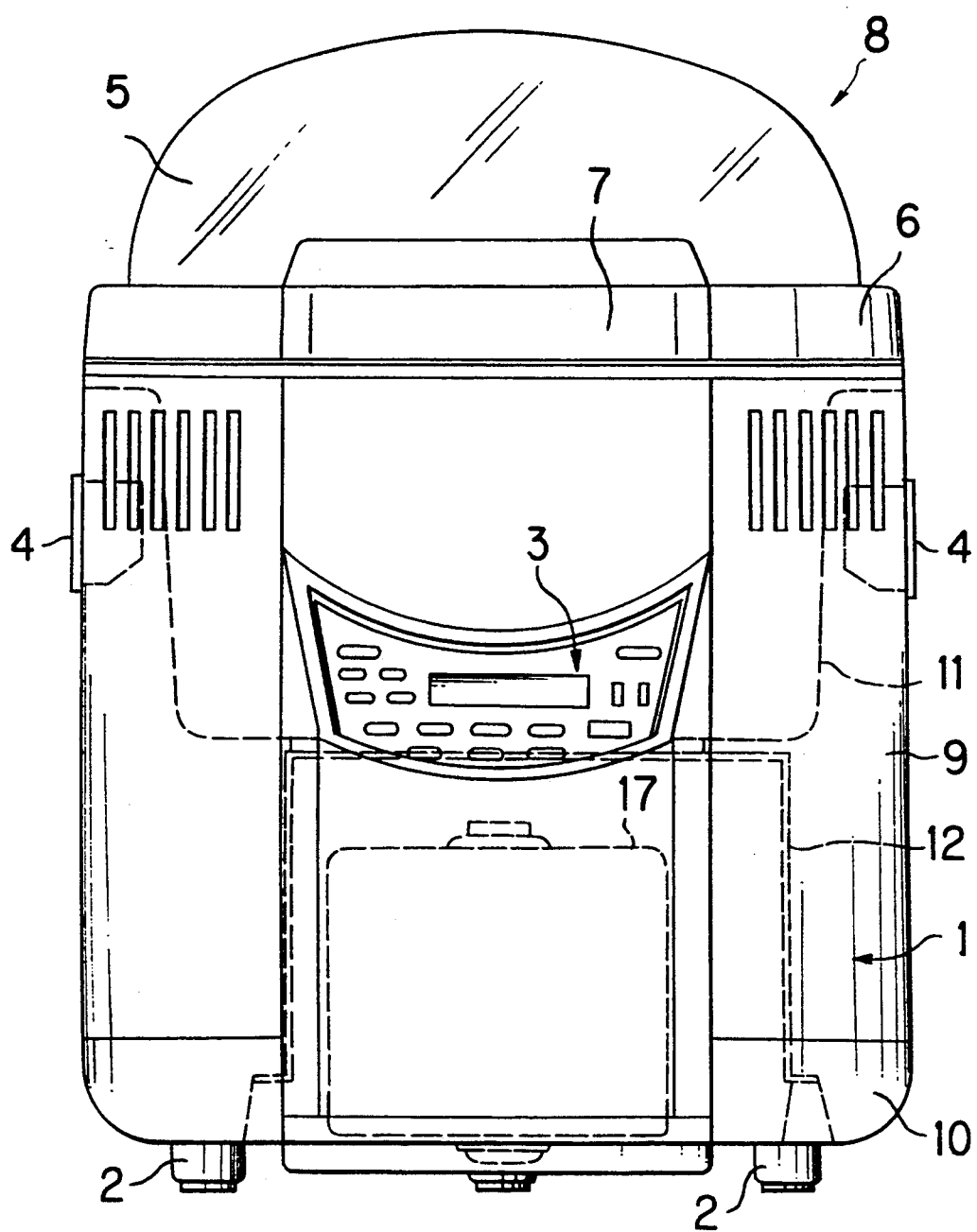
FIG. 1 is a whole elevation view of a bread production device having a driving construction of a kneading blade by a motor according to this invention.

FIG. 1 shows a whole elevation veiw of a bread production device of one embodiment wherein this invention is used. A cylindrical baking oven (1) is supported by a supporting body (2). An operation board (3) for determination of time and for baking selection is provided at an elevation central portion of the baking oven (1) and handles for carrying (4) are provided at the left and right sides of the baking oven (1), respectively. At the upper portion of the baking oven (1), a dome-shaped lid (5) made of transparent glass is provided so as to be capable of opening and closing, and a frame (6) at the front side of said dome-shaped lid (5) is integrated with a grip (7). The bread production device (8) is provided with a cylindrical outer case (9), a bottom case (10) inserted into the lower end portion of the outer case (9), and an upper half portion of an inner case (11) of an upper opening cylindrical vessel which forms an open chamber. Thus, the baking oven (1) having an open chamber is constructed of the outer case (9), bottom case (10) and inner case (11).

Figure 2:
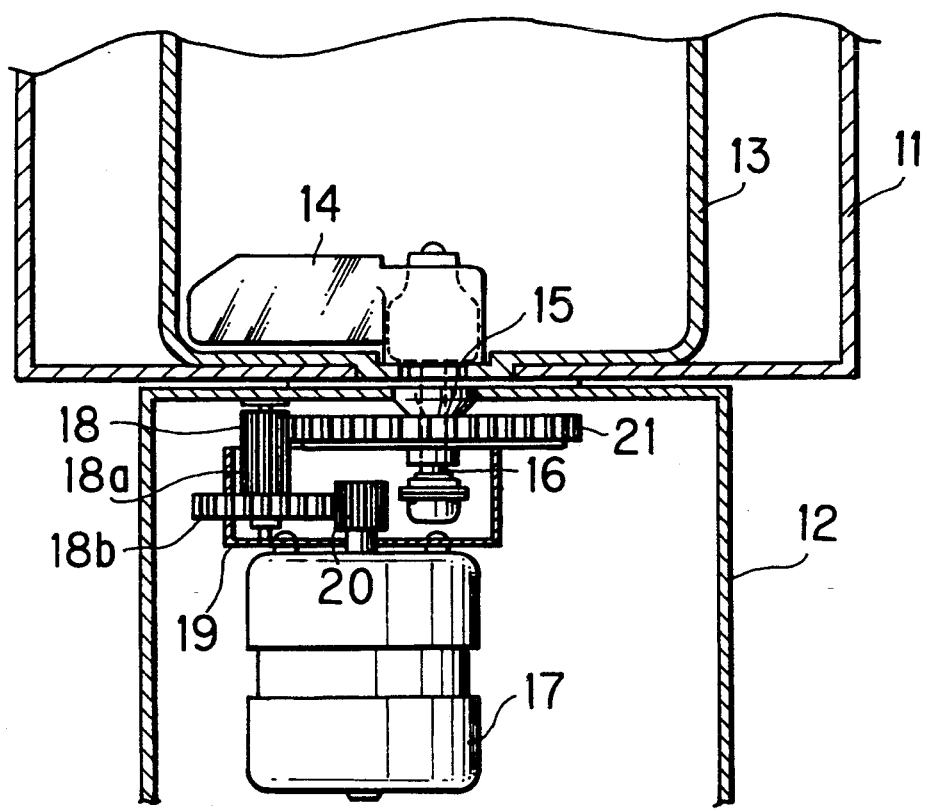
FIG. 2 is a partial sectional drawing which shows a driving construction of a kneading blade by a motor in an embodiment according to this invention.

FIG. 2 is a partial sectional drawing of the above bread production device (8). At the upper surface of a base stand (12) installed on the bottom (10), the bottom of the inner case (11) is fixed; and at the bottom of the inner case (11) is provided a bread baking case (13) which is an upper opening cylindrical vessel for kneading, fermentation and baking the bread dough added therein.

At the bottom of the bread baking case (13), a blade (14) which kneads the dough is provided. A bearing plate (15) is fixedly put between the inner case (11) and the base stand (12). A rotary shaft (16) supported by the bearing plate (15) rotatably is provided with a kneading blade (14) removably at the upper end thereof. A motor (17) having 2 kg. cm of torque and a two steps gear (18) are attached to the base stand (12) through a bracket (19).

The motor (17) is provided with a gear (20) which rotates by the power of the motor (17) at the top end thereof, and the rotary shaft (16) is provided with a gear (21) which rotates the rotary shaft (16). The gears (20) and (21) are connected through the two steps gear (18), said two steps gear (18) being constructed by combining a gear (18a) and gear (18b) to the same shaft. The motor 17 rotates the gear (20) at 1800 r.p.m., and the gear (20) rotates the gear (18b) which engages with the gear (20). The rotation of the gear (18b) is transmitted to the gear (18a) by decreasing its rotation, while gear (18a) transmits its rotation to the gear (21) which engages with the gear (18a). The kneading blade (14) rotates at 1200 r.p.m. and 30 kg. cm of torque.

In the above embodiment, the motor (17) is arranged in a longitudinal direction, but as another embodiment there exists that the motor (17) is arranged in a transverse direction. This embodiment will be described as follows.

Figure 3:
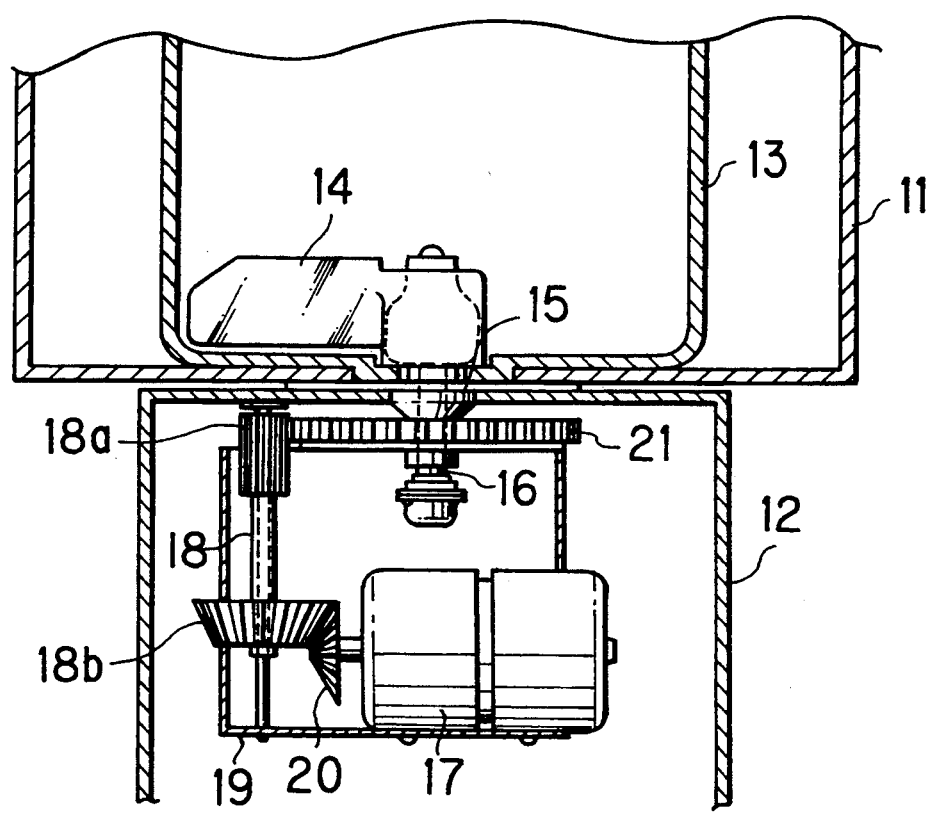
FIG. 3 is a partial sectional drawing which shows a driving construction of a kneading blade by a motor in another embodiment according to this invention.
Figure 5:
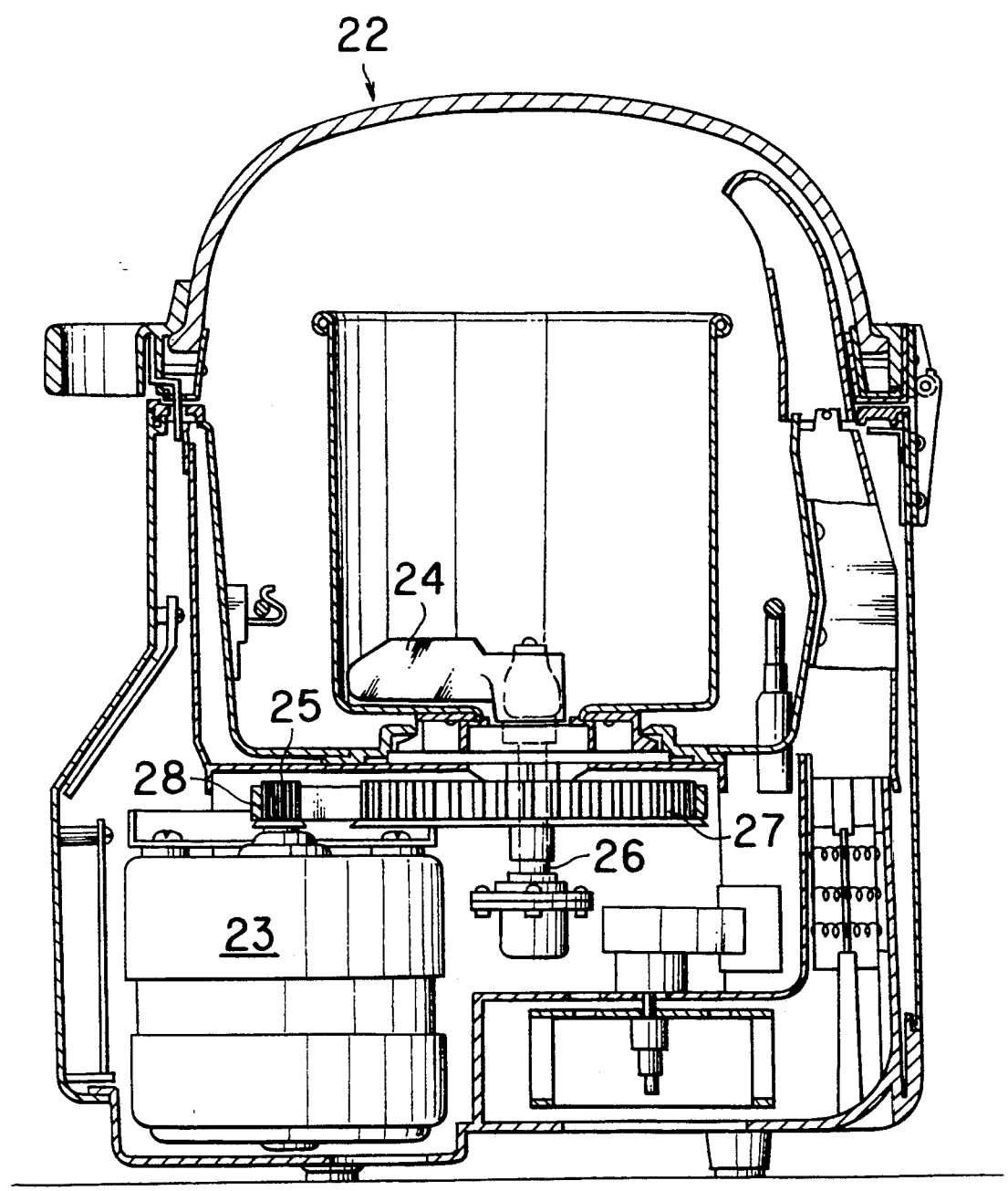
FIG. 5 is a partial sectional drawing which shows a driving construction of a kneading blade by the conventional motor.

As shown in FIG. 3, a gear (20) provided at the top end of the motor (17) and a gear (18b) of the two steps gear (18) which engages with gear (20) are used as bevel gears.

The motor (17) and the two steps gear (18) arranged in the transverse direction are attached to the base stand (12) through a bracket (19).

In this embodiment, since the revolutions per minute of the kneading blade (14) are 120 r.p.m., the time of bread making becomes longer than the conventional one as shown in FIG. 4. When using the conventional one, the kneading time thereof is 26 minutes, including the first kneading time (ml) 10 m. and the second kneading time (m2) 16 m., but in this embodiment its time is 55 m including the first kneading time (m3) 25 m. and the second kneading time (m4) 30 m. In preheating time (M1), stopped time (M2), fermentation (M3), rounding time (M4), waiting time (M5), roasting (M6), baking (M7), and cooling (M8), the programmed time is the same in the conventional one and in this embodiment.

Accordingly, if the total bread production time in the conventional construction is 3 to 4 hours, the time in this embodiment is 3 hours and 30 minutes to 4 hours and 30 minutes. Accordingly, its ratio is 1.12 times to 1.6 times.

However, in the same driving mechanism as this embodiment, if the revolutions per minute of the motor increase up to 2,400 r.p.m., the bread production time can be 15 minutes shorter. At this time, the reduction ratio is 10:1 and the rotations per minute of the kneading blade (14) are 180 r.p.m. However, each time shown in this is a standard one, and its time varies by several factors.

In this embodiment, the regulator device is constructed by gears, but these can be replaced with pulleys, cams and other means. Further, they can only be replaced with a synthetic combination construction.

Since this invention is constructed as described above, the following effects can be obtained.

In a driving mechanism of the kneading blade of a bread production device driven by a motor through the production gear, a reduction ratio of the reduction gear is adapted to be more than 10:1, thereby enabling the use of a motor having small torque and removing the restriction of layout of other parts and of positioning the motor.

What I claim is:

1. A driving mechanism for a kneading blade of a bread making device, comprising:
    a motor having a rotating shaft and axis associated therewith;
    a revolving shaft, and axis associated therewith, extending from one side of said kneading blade;
    a first driving member positioned on said rotating shaft;
    a first driven member linked with said first driving member and rotating at a speed slower than a speed of said first driving member, and said first driven member having a longitudinal axis;
    a second driving member connected to said first driven member;
    a second driven member linked with said second driving member, said second driven member rotating with a speed slower than a speed of said second driving member;
    said revolving shaft and said kneading blade are driven by said second driven member; and said axes of said revolving shaft, rotating shaft and at least said first driven member are substantially parallel to each other; and
    wherein said motor having a body with an outside periphery, and wherein said outside periphery projects within an imaginary circle having a diameter substantially equal to a sum of a diameter of said second driven member, a radius of said first driven member and a radius of said driving member.

2. A driving mechanism according to claim 1, wherein said driving mechanism is provided with a speed reduction ratio of more than 10:1.

3. A bread making device comprising:
    an inner case having bottom wall and a side wall, said bottom wall and side wall forming a chamber;
    a bread baking case situated within the chamber;
    a kneading blade rotatably mounted within said bread baking case;
    a base stand having at least an upper part;
    said inner case connected to said base stand, a support structure positioned within the base stand in the vicinity of said upper part;
    a driving mechanism positioned between said support structure and said upper part of the base stand, said driving mechanism including
    a rotating shaft, a revolving shaft extending from said kneading blade, an intermediary shaft, a first driving member positioned on said rotating shaft, a first driven member attached to said intermediary shaft and linked with said first driving member, a second driving member supported by said intermediary shaft consentrically to said first driven member, a second driven member linked with said second driving member, wherein said revolving shaft and said kneading blade being driven by said second driven member.

4. A bread making device according to claim 3, wherein one end of said intermediary shaft is rotatably supported by said support structure and other end of said intermediary shaft is rotatably supported by said upper part of the base stand, said second driven member, said revolving shaft and said kneading blade are rotatably supported only by a bearing plate interposed between said bottom wall of the inner case and said upper part of the base stand.

5. A bread making device according to claim 4, wherein said rotating shaft is connected to a motor; and wherein longitudinal axes of said revolving shaft, said intermediary shaft, and said rotating shaft are substantially parallel to each other.

6. A bread making device according to claim 5, further comprising said motor having a body with an outside periphery, wherein said outside periphery projects within an imaginary circle having a diameter substantially equal to a sum of a diameter of said second driven member, a radius of said first driven member and a radius of said second driving member.

* * * * *